June 26, 1956   L. W. WIGHTMAN   2,752,208
SHAFT BEARING
Filed Sept. 27, 1954   2 Sheets-Sheet 1
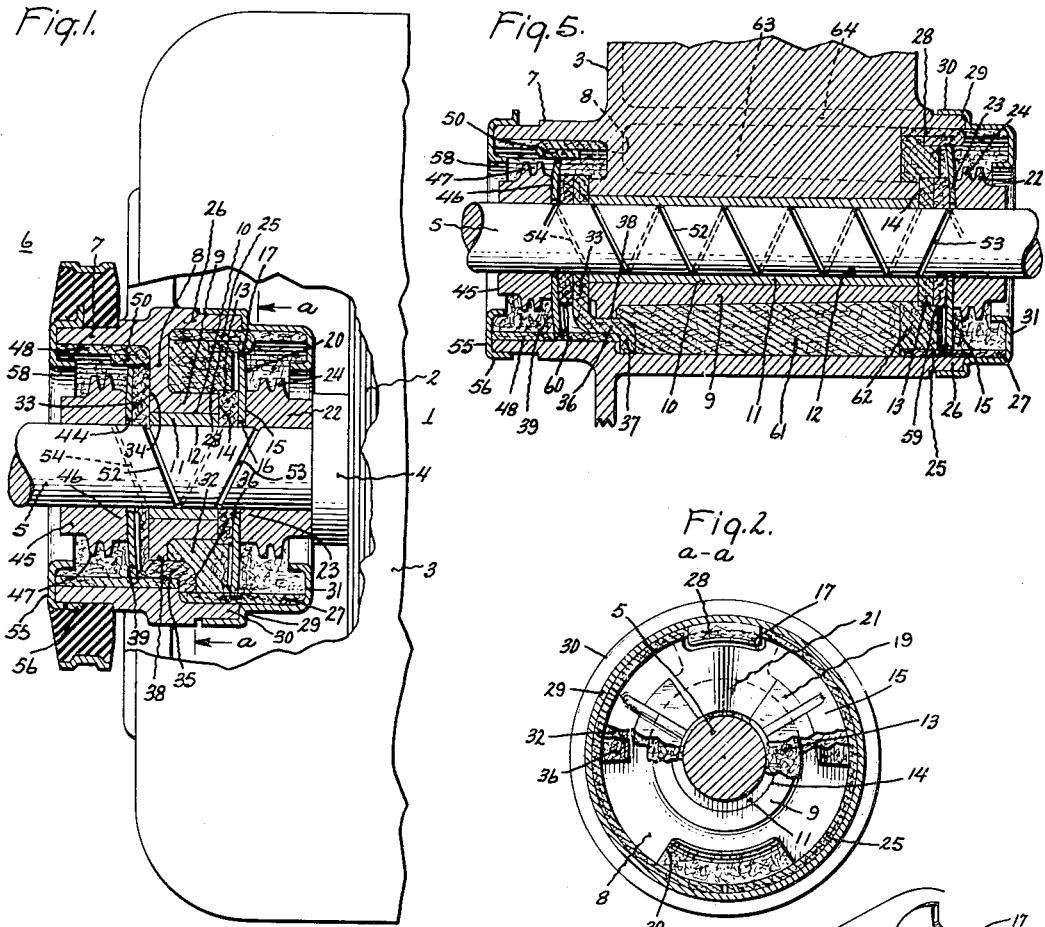
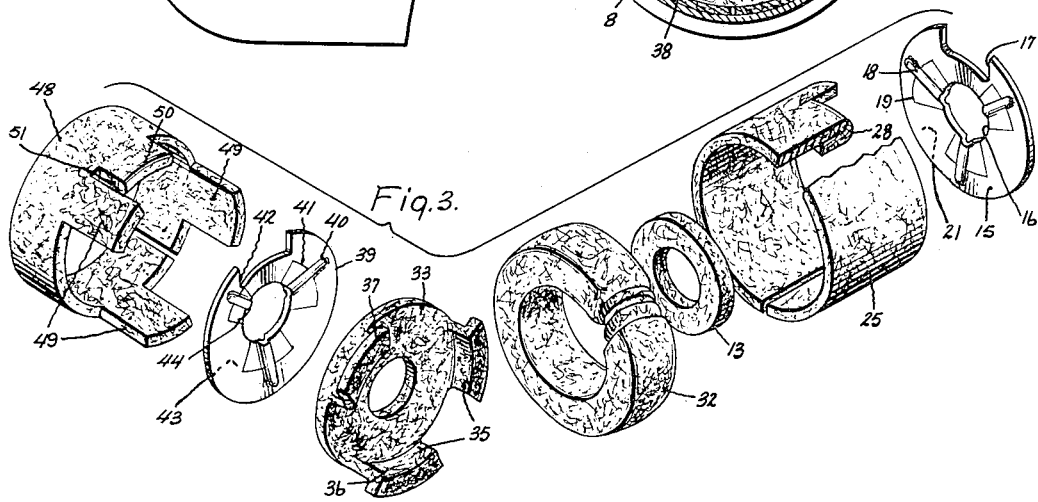
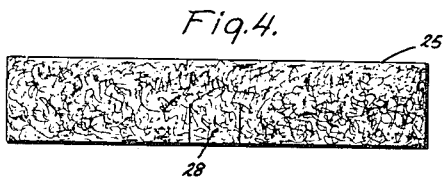
Inventor:
Lawrance W. Wightman,
by His Attorney.

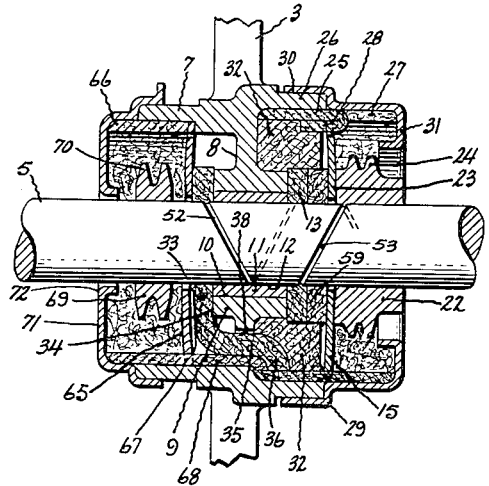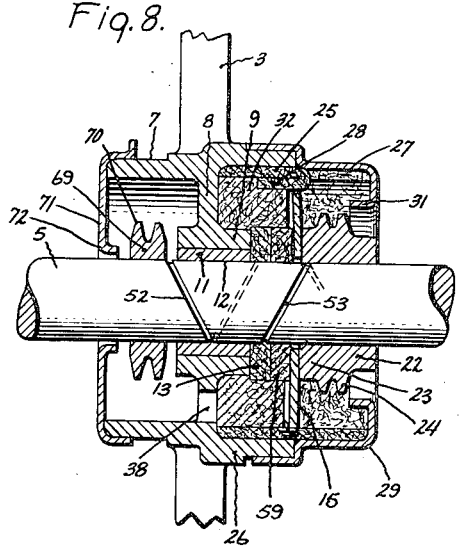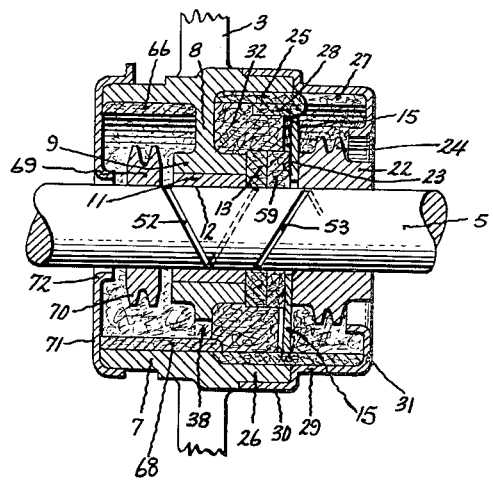

United States Patent Office 2,752,208
Patented June 26, 1956

2,752,208
SHAFT BEARING

Lawrance W. Wightman, Fort Wayne, Ind., assignor to General Electric Company, a corporation of New York Application September 27, 1954, Serial No. 458,632

22 Claims. (Cl. 308—171)

This invention relates to bearings, and more particularly to a bearing having improved lubrication means and end play prevention means.

It is highly desirable in many applications of electric motors that the motor be operable in either direction of rotation, and that it be capable of use in many different positions varying all the way from the horizontal to the vertical, with either end of the motor up in the vertical position. A principal obstacle to such use of an electric motor has been the difficulty of obtaining adequate lubrication of the bearings when the motor was put in a variety of positions or reversed, or both reversed and displaced. It generally occurred that in certain positions and in one direction of rotation a part of the bearing would be starved for lubrication and would, therefore, wear much too rapidly. Another feature of most bearings presently in use is that, even if the motor is run only in the horizontal position, there is provided no adequate means to prevent undesirable end-play which may result in unwanted noise and thumping. It will be seen, therefore, that it is highly desirable to provide a bearing structure with which quiet operation of a dynamoelectric machine may be achieved and which will substantially eliminate end play and the noise resulting from the thrust bearing surfaces separating and coming together again. In addition, the bearing structure should be such in many applications that positive lubrication will be provided whatever the position of the motor. Such positive lubrication should apply both to the radial bearing structure and to the thrust bearing structure.

An object of this invention is, therefore, to provide an improved bearing including the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, provides a bearing having a radial bearing arranged to support rotatably a shaft having a helical groove formed therein over at least that part of its surface which contacts the radial bearing. A wick is provided at each end of the radial bearing surface so that whatever the direction of rotation of the motor, an adequate supply of lubricant will be pumped by the groove in the shaft from one wick to the other. Means are also provided to return the lubricant from the receiving wick to the sending wick. On each side of the previously mentioned groove in the shaft there is provided an oppositely disposed groove which is preferably shorter than the first-mentioned groove. Each of these second and third grooves is arranged in combination with thrust bearing means so that whatever the direction of rotation one of the grooves will tend to force lubricant toward the thrust bearing arrangement with which it is combined while the other groove will tend to force lubricant away from its thrust bearing arrangement. However, the first groove is so formed that it pumps a greater quantity of lubricant than either of the second or third grooves so that even where one of the second or third grooves is pumping lubricant away from a thrust bearing surface the first groove will cause a positive amount of lubricant to be provided to that surface. Means are preferably provided to return the lubricant from the thrust bearing arrangements to the wicks. It will be seen that all parts of the bearing receive positive lubrication and that the wicks provide spring loading to force the thrust bearing surfaces together and prevent noise and end play.

In a modification of this invention the bearing may be constructed for use in a unit, i. e. single, bearing dynamoelectric machine by the provision of different dimensions for the radial bearing surface and the size of the wicks.

In another modification of the invention, one of the thrust bearing arrangements previously described and the shaft groove used in combination therewith may be omitted so that a single bearing will provide for only one direction of thrust. In such a case, it is desirable to use two similar bearings at each end respectively of the shaft. In still another modification of this invention, one of the wicks and one thrust bearing arrangement may be omitted for purposes of economy where it is proposed to run the machine in a single predetermined direction. In yet another modification of this invention the structure is similar to that of the last-mentioned modification with the difference that one of the lubricant returning means is omitted. Such an arrangement may be used to economical advantage where the use of the dynamoelectric machine indicates that it will run in a single direction and will be maintained in a predetermined position, generally horizontal.

In the drawing, Figure 1 is a side view, partly cut away and partly in cross section, of a dynamoelectric machine having a bearing provided in accordance with the preferred embodiment of this invention;

Figure 2 is a cross-sectional view along lines a—a of Figure 1;

Figure 3 is an exploded view in perspective of certain components of the bearing shown in Figure 1;

Figure 4 is a plane view of one of the elements of Figure 3 before it is formed for insertion into the bearing structure;

Figure 5 is a side view, partly in cross section, of an improved bearing constructed according to the second embodiment of this invention;

Figure 6 is a side view, partly in cross section, of the third embodiment of this invention;

Figure 7 is a side view, partly in cross section, of the fourth modification of this invention; and Figure 8 is a side view, partly in cross section, of the fifth embodiment of this invention.

Referring now to Figures 1, 2, 3, and 4 of the drawings, the preferred embodiment of this invention will be described. A rotatable machine, such as an electric motor generally indicated at 1 and having a stator 2 generally made up of thin laminations of magnetic material, has a housing such as 3 within which the stator 2 may be secured. Motor 1 may be provided with a rotor (not shown) concentrically mounted within stator 2 and secured to a shaft 4 so that the rotor will cause shaft 4 to rotate when suitable electric current is supplied to the motor. Shaft 4 has an extension 5 which is arranged to be rotatably mounted within a bearing generally indicated at 6.

The housing 3 is formed into a hub portion, as shown at 7, within which the individual components of bearing 6 are arranged. Housing 3 may be further formed to have a plurality of inwardly extending spokes 8, in the form of a spider, which terminate in a relatively short sleeve member 9. Secured to the inner surface 10 of sleeve member 9 is a bearing sleeve member 11 having an inner bearing surface 12 which is arranged rotatably to support shaft portion 5. An annular wick 13 preferably formed of an absorbent material having spring qualities, such as felt, for instance, is arranged about shaft portion 5 in abutting relation with the end surface 14 of members 9 and 11. A disc-like member 15 having a central opening 16 is arranged about shaft portion 5 in abutting relation with wick 13. For economical reasons, disc 15 is generally formed of a punched material and it will be observed that the disc has a somewhat conical shape which is a result of the fact that it is almost impossible to punch sheet material in such a way that the product will be absolutely flat. As well best be seen in Figures 2 and 3, disc 15 has a recess 17 formed therein for a purpose which will be explained below. The disc also is preferably formed with three equispaced grooves 18 facing away from wick 14 and extending radially down to central opening 16 of the disc. Each of grooves 18 has the major part of its length set in a section 19 of the disc which is formed as a slight inward step from the cone surface 20 of the disc. By this means there are provided between flatted areas 19 three areas 21 so that three definite bearing surfaces will be provided by the disc 15. It will, of course, be understood that this particular configuration of the disc is not essential to this invention, and that other disc formations, including an entirely flat disc, may be provided.

Formed on shaft portion 5 so as to be rotatable therewith is a member 22 having a surface 23 abutting against the bearing surfaces 21 of disc 15. Member 22 is provided with a pair of peripheral annular ridges, or lubricant slingers, 24 for purpose to be hereinafter explained. It will be understood that member 22 may be formed integral with shaft portion 5 or may be a separate element secured to the shaft as desired. A relatively thin member 25 of absorbent material, such as felt, best seen in Figure 4, is formed into an annulus whose outer surface abuts the inner surface of inner extension 26 of the hub portion 7 formed in housing 3. A substantial portion, indicated at 27, of member 25 is concentric with and outside annular ridges 24 of member 22. Member 25 is provided with a cut-away finger portion 28 which is bent back to fit within recess 17 of disc 15 so as to key the disc against rotation relative to hub 7. A member 29 is secured to extension 26 of hub 7 by an annular flange 30 which fits tightly about the outer surface of the extension. Member 29 has an inwardly extending annular flange 31 at its other end which serves to maintain absorbent member 25 in position, and has another purpose which will be explained below. In contact with both member 25 and wick 13 there is provided a substantially annular member 32 of absorbent material which is secured between member 25 on its outer surface and part 9 of the bearing on its inner surface.

Another annular wick member 33 is provided on the opposite side of part 9 with respect to wick 13. Wick 33 abuts against surface 34 formed by part 9 and sleeve bearing member 11, and is provided with three fingers 35 each having an axially extending portion 36 and a radially extending portion 37. The fingers extend through the openings 38 in spider 8 so as to be in contact with member 25 and wick 32. A disc 39 is formed in similar fashion to disc 15, with grooves 40 and flatted portions 41 corresponding respectively to grooves 18 and flatted portions 19, a recess 42 corresponding to recess 17 and bearing surfaces 43 corresponding to bearing surfaces 21. Disc 39 has an opening 44 and is arranged over shaft portion 5 abutting wick 33. It will be observed that openings 16 and 44 of discs 15 and 39 respectively are large enough to permit the discs to fit over shaft portion 5 without touching it.

A member 45 is secured to shaft portion 5 so as to be rotatable therewith and is similar in shape to member 22, having a bearing surface 46 abutting against disc 39 and a pair of peripheral annular ridges 47. A strip of absorbent material 48, such as felt, is provided and is rolled up into an annulus, as shown in Figures 1 and 3, within hub portion 7. Strip 48 is provided with three fingers 49 which are so spaced that when strip 48 is in position fingers 49 will extend through openings 38 in spider 8 and abut against portions 36 of the fingers 35 of wick 33. A fourth finger 50 preferably similar in shape to the others, is provided. Finger 50, however, is bent back upon itself as shown at 51 so that it substantially fills recess 42 in disc member 39 to key the disc against rotation.

An annular member 55 has a peripheral flange 56 by means of which it may be secured to the outside of hub portion 7. A re-entrant flange 58 extends into the bearing area for a purpose to be hereinafter described.

A helical groove 52 is formed on that portion of the surface of shaft portion 5 which is rotatable supported by bearing surface 12 of tubular member 11. A shorter, oppositely disposed helical groove 53 is formed to the right of groove 52, and a second short oppositely disposed helical groove 54 is formed in shaft portion 5 to the left of groove 52.

Referring now principally to Figure 1 of the drawings, the operation of the improved bearing of this invention will be described. Let it be assumed that shaft 4 is rotating counter-clockwise as viewed from the left end of the shaft in Figure 1, and that wick 33 is impregnated with a lubricant. As shaft 4 rotates, groove 52 will pump lubricant from wick 33 across the journal surface of shaft portion 5 to lubricate bearing surface 12. A certain amount of lubricant will continue to be pumped by groove 52 until it reaches disc 15. In this direction of rotation, groove 53 will tend to pump back the lubricant against the action of groove 52. However, the two grooves are so formed that the output of lubricant from groove 52 is larger than that from groove 53 and a predetermined differential amount of lubricant will reach the thrust bearing surface 23 of member 22. This action is aided by the presence of grooves 18 in disc 15 which tend to conduct the lubricant up between the relatively rotating surfaces 21 and 23. Returning now to the right end of groove 52, a certain amount of lubricant will have been absorbed by wick 13 after travelling across surface 12 of bearing member 11. This lubricant will then be returned to wick 33 through wick 32 and fingers 35 of wick 33 so that the operation may be repeated. That part of the lubricant used to lubricate the surface of member 22 will be forced by centrifugal action outwardly until it reaches lubricant slingers 24 whence it will be thrown out to part 27 of absorbent member 25, which will return the lubricant to wick 33 through fingers 32.

Groove 54 will, for this direction of rotation, pump a certain amount of lubricant from wick 33 to bearing surface 46 of member 45. The grooves 40 of disc 39 will aid in the distribution of the lubricant to the relatively rotating surfaces 46 and 43. As with member 22, the lubricant will be forced out by centrifugal action to lubricant slingers 47 and there thrown to member 48 where fingers 49 will return it to wick 33. Reentrant flange 31 serves to prevent loss of lubricant when it is thrown from slingers 24 to member 25, and flange 50 prevents loss of lubricant when it travels from slingers 47 to member 48.

When the direction of rotation is reversed, the functions of wicks 13 and 33, and of grooves 53 and 54 are reversed, and the lubricant will travel across bearing surface 12 in the opposite direction. Groove 54 is similar to groove 53 in that it has a lower lubricant output than groove 52 so that positive lubrication of surfaces 43 and 46 is insured in the same manner that lubrication of surfaces 21 and 23 was previously provided for. The lubricant return means will function as before.

It will be seen that, as the bearing is assembled, wick 13 is compressed against disc 15 and will, therefore, act as a spring load to force disc 15 against member 22. Wick 33 will perform the same function with respect to disc 39 and member 45.

It will be apparent from the foregoing that the combination of the grooves in shaft portion 5 and the wicking system insure by positive pumping an adequate supply of lubricant for all relatively rotating surfaces whatever may be the position of the motor and, consequently, of bearing 6 and whatever the direction of rotation. It will also be noted that wicks 13 and 33, in addition to their lubricating functions, act to spring load the thrust bearing surfaces together to prevent end-play and undesirable thumping noises.

It will be understood that, while no thrust bearing means other than those described are needed, some type of radial bearing support should be provided at the other end of motor 1 when the bearing described above is utilized.

Referring now to Figure 5 the second embodiment of the invention will be described, using like numerals for like parts. The embodiment of Figure 5 will find its application principally in unit, i. e., single, bearing motors. As in the first embodiment there is provided housing member 3 having a hub portion 7 formed thereon with a spider member 8 extending inwardly to a sleeve member 9 having an inner surface 10 to which a bearing member 11 having a bearing surface 12 is secured. A wick 13 is provided abutting surface 14 of members 9 and 11, and a second wick 59 is provided next to the first wick. The provision of the two wicks constitutes an equivalent of a single wider wick which is deemed desirable in this modification because the greater length of the bearing will require a somewhat higher degree of spring loading against disc 15 to prevent end play and the noise resultant therefrom. As before, a member 22 having a surface 23 is provided with an absorbent annulus 25 secured within extension 26. The other end of the bearing is similarly modified with an extra wick 60 being placed next to wick 33 in order to obtain the aforementioned increased spring loading action. In view of the length of the unit bearing structure, members 61 and 62 of absorbent material have been provided in lieu of the single wicking member 32 of Figure 1. Member 61 extends along the entire outside surface of sleeve member 9 and is in contact with fingers 36 of wick 33 at one end and with member 62 at the other end. Member 62 in turn communicates with wicks 13 and 59, member 25, and member 61. A plurality of webs 63 extend between part 64 of hub portion 7 and sleeve member 9 thereby compartmenting the individual absorbent members 61. This feature is provided to insure sufficient structural strength to the bearing in view of its length and, of course, may be obviated if so desired by selection of the material of which housing member 3 will be formed. It will be apparent that the bearing will lubricate itself in the same manner as the bearing of Figure 1, and that the double wicking provided at each end will insure a spring loaded action against the thrust bearing members similar to that of Figure 1. Thus, the embodiment of Figure 5 will provide positive lubrication between all relatively rotating surfaces at all times, whatever the direction of rotation of the motor and whatever position it may be used in. The defect of end play noise has been obviated in the same manner.

Referring now to Figure 6, there will be described an embodiment of this invention which is primarily applicable where it is desired to use two like bearings, one at each end of the machine, or to divide the thrust load between two bearings. As in the second embodiment (Figure 5), a second wick 59 is used in conjunction with wick 13 to provide additional spring loading action on disc 15. Instead of disc 39 of Figure 1, a disc 65 (without a recess 42) is provided. Disc 65 is held in place by the end of a felt strip 66 which bears against it at all points of its periphery except where openings 67 are provided to allow fingers 68 of strip 66 to extend into contact with fingers 35 of wick 33. Instead of a member 45 (Figure 1) in contact with the disc, a member 69 is secured to the shaft in spaced relation with disc 65. Member 69 is provided with ridges, or slingers, 70 so that lubricant reaching member 69 will be caused to move to the slingers by centrifugal action and there will be thrown into strip 66 to be returned to wick 33. Since there is no thrust bearing action at the left end of the bearing of Figure 6, it is possible to omit groove 54, shown in Figure 1, in shaft portion 5. In operation, the lubrication of the bearing surfaces will be the same as will be the spring loading action of wicks 13 and 59 against disc 15. However, no provision is made for a thrust of the shaft from the left, as viewed in Figure 6, and this type of bearing is provided where a similar bearing is placed at the other end of the machine to absorb thrust of the shaft 5 from the left. It will also be observed that an end member 71 extending relatively close to shaft portion 5, as at 72, is provided. This is desirable in view of the fact that there is no thrust bearing surface on the left side of the bearing and, therefore, when the bearing is in certain positions there may be a somewhat greater flow of lubricant to the left thereby necessitating an additional provision for preventing escape thereof.

Referring now to Figure 7, there is shown an embodiment which finds its most suitable application in machines which are non-reversible but may be required to operate in any position. Since the machine will be non-reversible, it ceases to be necessary to provide means for supplying lubricant to be pumped by groove 52 in both directions, and it is ample to provide means for returning the lubricant in one direction only, once it has been pumped across bearing surface 12. Thus, it is possible to omit wick 33 and disc 39 of the previous embodiments, since the lubricant will travel from wicks 13 and 59 across bearing surface 12, be thrown out to strip 66 from slingers 70 of member 69, and thence return via fingers 68 to member 32 and wicks 13 and 59. In all other respects the operation of this embodiment is the same as that of the previously described embodiments.

Referring to Figure 8 of the drawing, there is shown an embodiment of the invention which is especially suitable where the bearing is to be used in a machine which is run in a single direction only and which is maintained substantially horizontal during operation. This embodiment follows the lines of the embodiment of Figure 7, with the exception that strip 66 with its fingers 68 reaching through openings 38 in spider 8 has been omitted. The lubricant will be forced to the thrust bearing surface and across the bearing surface 12 as before. However, in the horizontal position, that part of the lubricant which passes across surface 12 will return by gravity by being thrown outwardly by slingers 70 and then flowing through opening 38 back into member 32 and to wicks 13 and 59.

It will be seen from the above that this invention, in all embodiments thereof, provides an improved positive lubrication system for all relatively rotating surfaces of a bearing and that it eliminates undesirable thrust bearing end play noise by causing the lubricating wick to perform the extra function of spring loading the thrust bearing members.

It will, of course, be apparent that this invention is applicable to all types of machinery involving a rotating member such as a shaft. It will also be apparent that while the invention has been explained by describing particular embodiments thereof, improvements and modifications may be made without departing from the scope of the invention as defined in the appended claims.

What I claim as new and desire to secure by Letters Patent of the United States is:

1. In combination, a bearing and a shaft rotatably mounted therein; said shaft having first and second helical grooves formed therein in oppositely disposed relation to each other; said bearing comprising a bearing member positioned over the part of said shaft having said first groove, wick means of absorbent material having spring qualities abutting an end of said bearing member, a thrust bearing member abutting said wick means and positioned over the part of said shaft having said second groove, a member formed on said shaft and positioned in rotatably abutting relation with said thrust bearing member, said grooves each extending to said wick means, said wick means being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick means.

2. In combination, a bearing and a shaft rotatably mounted therein; said shaft having first and second helical grooves formed therein in oppositely disposed relation to each other; said bearing comprising a bearing member positioned over the part of said shaft having said first groove, wick means of absorbent material having spring qualities abutting an end of said bearing member, a thrust bearing disc-like member having an opening larger than said shaft abutting said wick means and positioned over the part of said shaft having said second groove, a member formed on said shaft and having a surface arranged in rotatably abutting relation with said disc-like member, said grooves each extending to said wick means, said wick means being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick means.

3. In combination, a bearing and a shaft rotatably mounted therein; said shaft having first and second helical grooves formed therein in oppositely disposed relation to each other; said bearing comprising a bearing housing member having an inwardly extending spider, a bearing member secured to the inner part of said spider and positioned over the part of said shaft having said first groove, a wick of absorbent material having spring qualities abutting an end of said bearing member, a thrust bearing disc member abutting said wick and positioned over the part of said shaft having said second groove, said disc member having equispaced raised portions extending away from said wick, a member secured to said shaft and having a surface arranged in rotatably abutting relation with said raised portions, said grooves each extending to said wick, said wick being adapted to be impregnated with lubricant whereby rotation of said shaft will cause supplies of lubricant to be pumped respectively by said first groove across the surface of said bearing member and by said second groove to the surfaces of said thrust bearing member, and means for returning both of said supplies of lubricant to said wick.

4. In combination, a bearing and a shaft rotatably mounted therein; said shaft having first and second and third helical grooves formed therein, said second and third grooves being formed at each end respectively of said first groove and in oppositely disposed relation thereto; said bearing comprising a bearing member positioned over the part of said shaft having said first groove, wicks of absorbent material having spring qualities respectively abutting each end of said bearing member, thrust bearing members respectively abutting said wicks and respectively positioned over the parts of said shaft having said second and third grooves, members rigidly secured to said shaft and respectively positioned in rotatably abutting relation with said thrust bearing members, said wicks being adapted to be impregnated with lubricant whereby rotation of said shaft will cause supplies of lubricant to be pumped respectively from one of said wicks by said first groove across the surface of said bearing member and by said second groove to the surface of one of said thrust bearing members, and from the other of said wicks by said third groove toward said bearing member, said first groove having a greater pumping capacity than either said second or said third groove whereby a predetermined differential supply of lubricant will be pumped to the surface of the other of said thrust bearing surfaces, and means for returning said supplies of lubricant to said wicks.

5. In combination, a bearing and a shaft rotatably mounted therein; said shaft having first and second helical grooves formed therein in oppositely disposed relation to each other; said bearing comprising a bearing member positioned over the part of said shaft having said first groove, a wick of absorbent material having spring qualities abutting an end of said bearing member, a thrust bearing member abutting said wick and positioned over the part of said shaft having said second groove, a member formed on said shaft and positioned in rotatably abutting relation with said thrust bearing member, said grooves each extending to said wick, said wick being adapted to be impregnated with lubricant whereby rotation of said shaft will cause supplies of lubricant to be pumped respectively by said first groove across the surface of said bearing member and by said second groove to the surface of said thrust bearing member.

6. In combination, a bearing and a shaft rotatably mounted therein; said shaft being adapted to be selectively rotatable in opposite directions and having first, second and third helical grooves formed therein, said second and third grooves being formed at each end respectively of said first groove and in oppositely disposed relation thereto; said bearing comprising a bearing member positioned over the part of said shaft having said first groove, wicks of absorbent material having spring qualities respectively abutting each end of said bearing member, annular thrust bearing members each having an opening larger than said shaft respectively abutting said wicks and respectively positioned over the parts of said shaft having said second and third grooves, member formed on said shaft and respectively having surfaces arranged in rotatably abutting relation with said thrust bearing members, said wicks being adapted to be impregnated with lubricant whereby rotation of said shaft will cause supplies of lubricant to be pumped respectively from one of said wicks by said first groove across the surface of said bearing member and by said second groove to the surface of one of said thrust bearing members, and from the other of said wicks by said third groove toward said bearing member, said first groove having a greater pumping capacity than either said second groove or said third groove whereby a predetermined differential supply of lubricant will be pumped to the surface of the other of said thrust bearing surfaces, said wicks and said second and third grooves being respectively adapted to exchange functions upon rotation of said shaft in opposite direction, and means for returning said supplies of lubricant to said wicks.

7. In combination, a bearing and a shaft rotatably mounted therein; said shaft being adapted to be selectively rotatable in opposite directions and having first, second and third helical grooves formed therein, said second and third grooves being formed at each end respectively of said first groove and in oppositely disposed relation thereto; said bearing comprising a bearing member positioned over the part of said shaft having said first groove, annular wicks of absorbent material having spring qualities respectively abutting each end of said bearing member, annular thrust bearing members respectively abutting said wicks and respectively positioned over the parts of said shaft having said second and third grooves, annular members formed on said shaft and respectively having surfaces arranged in rotatably abutting relation with said thrust bearing members, said wicks being adapted to be impregnated with lubricant whereby rotation of said shaft will cause supplies of lubricant to be pumped respectively from one of said wicks by said first groove across the surface of said bearing member and by said second groove to the surface of one of said thrust bearing members, and from the other of said wicks by said third groove toward said bearing member, said first groove having a greater pumping capacity than either said second groove or said third groove whereby a predetermined differntial supply of lubricant will be pumped to the surface of the other of said thrust bearing surfaces, said wicks and said second and third grooves being respectively adapted to exchange functions upon rotation of said shaft in the opposite direction, and absorbent means respectively abutting said wicks for returning said supplies of lubricant thereto.

8. In combination, a bearing and a shaft rotatably mounted therein; said shaft being adapted to be selectively rotatable in opposite directions and having first, second and third helical grooves formed therein, said second and third grooves being formed at each end respectively of said first groove and in oppositely disposed relation thereto; said bearing comprising a bearing housing member having an inwardly extending spider, a bearing member secured to the inner part of said spider and positioned over the part of said shaft having said first groove, annular wicks of absorbent material having spring qualities respectively abutting each end of said bearing member, annular thrust bearing members each having a central opening larger than said shaft respectively abutting said wicks and respectively spacedly positioned over the parts of said shaft having said second and third grooves, annular members formed on said shaft and respectively having surfaces arranged in rotatably abutting relation with said thrust bearing members, said wicks being adapted to be impregnated with lubricant whereby rotation of said shaft will cause supplies of lubricant to be pumped respectively from one of said wicks by said first groove across the surface of said bearing member and by said second groove to the surface of one of said thrust bearing members, and from the other of said wicks by said third groove toward said bearing member, said first groove having a greater pumping capacity than either said second groove or said third groove whereby a predetermined differential supply of lubricant will be pumped to the surface of the other of said thrust bearing surfaces, said wicks and said second and third grooves being respectively adapted to exchange functions upon rotation of said shaft in the opposite direction, and means for returning said supplies of lubricant to said wicks comprising masses of absorbent material within said housing extending axially along said bearing and abutting said wicks.

9. In combination, a bearing and a shaft rotatably mounted therein; said shaft being adapted to be selectively rotatable in opposite directions and having first, second and third helical grooves formed therein, said second and third grooves being formed at each end respectively of said first groove and in oppositely disposed relation thereto; said bearing comprising a bearing housing member having an inwardly extending spider, a bearing member secured to the inner part of said spider and positioned over the part of said shaft having said first groove, annular wicks of absorbent material having spring qualities respectively abutting each end of said bearing member, annular thrust bearing members respectively abutting said wicks and respectively positioned over the parts of said shaft having said second and third grooves, annular members formed on said shaft and respectively having surfaces arranged in rotatably abutting relation with said thrust bearing members, said rigidly secured member respectively having peripheral ridges, said wicks being adapted to be impregnated with lubricant whereby rotation of said shaft will cause supplies of lubricant to be pumped respectively from one of said wicks by said first groove across the surface of said bearing member and by said second groove to the surface of one of said thrust bearing members, and from the other of said wicks by said third groove toward said bearing member, said first groove having a greater pumping capacity than either said second groove or said third groove whereby a predetermined differential supply of lubricant will be pumped to the surface of the other of said thrust bearing surfaces, said wicks and said second and third grooves being respectively adapted to exchange functions upon rotation of said shaft in the opposite direction, and means for returning said supplies of lubricant to said wicks comprising first and second strips of absorbent material formed into substantially cylindrical shapes and respectively spacedly arranged about said means formed on said shaft, one of said strips being arranged to have an end abutting one of said wicks, and an intermediate wick member arranged to connect the other of said strips to the other of said wicks, said peripheral ridges being adapted to receive lubricant and sling it outwardly to said strips respectively.

10. In combination, a bearing and a shaft rotatably mounted therein; said shaft being adapted to be selectively rotatable to opposite directions and having first, second and third helical grooves formed therein, said second and third grooves being formed at each end respectively of said first groove and in oppositely disposed relation thereto, said first groove having a greater pumping capacity than either of said second and third grooves, said bearing comprising a bearing housing member having an inwardly extending spider, a sleeve member secured to the inner end of said spider, a sleeve bearing member secured within said sleeve member and substantially coextensive therewith, said sleeve bearing member being positioned over the part of said shaft having said first groove, wicks of absorbent material having spring qualities respectively abutting each end of said bearing member and being arranged on said shaft, annular thrust bearing members each having a central opening larger than said shaft respectively abutting said wicks and respectively positioned over the parts of said shaft having said second and third grooves, said thrust bearing members respectively having equispaced raised portions extending away from said wicks and further each respectively having a peripherally formed recess, annular members rigidly secured to said shaft and respectively having surfaces arranged in rotatably abutting relation with said thrust bearing members, said rigidly secured members having annular peripheral ridges formed thereon, said wicks being adapted to be impregnated with lubricant whereby rotation of said shaft will cause supplies of lubricant to be pumped respectively from one of said wicks by said first groove across the surface of said bearing member and by said second groove to the surface of one of said thrust bearing members, and from the other of said wicks by said third groove toward said bearing member whereby a predetermined differential supply of lubricant will be pumped to the surface of the other of said thrust bearing surfaces, said wicks and said second and third grooves being respectively adapted to exchange functions upon rotation of said shaft in the opposite direction, and means for returning said supplies of lubricant to said wicks comprising first and second strips of absorbent material formed into substantially cylindrical shapes and respectively spacedly arranged about said rigidly secured means, one of said strips having fingers formed on an end thereof and respectively arranged to extend through the openings of said spider, each of said strips having a finger formed thereon and arranged to extend respectively into said thrust bearing member recesses thereby to maintain said thrust bearing members in stationary assembled relation, said first mentioned fingers of said one strip and the end of said other strip being arranged to abut one of said wicks, and a wick member positioned about the periphery of said sleeve and arranged to abut both said wicks and the other of said strips.

11. In combination, a bearing and a shaft rotatably mounted therein; said shaft being adapted to be selectively rotatable in opposite directions and having first, second and third helical grooves formed therein, said second and third grooves being formed at each end respectively of said first groove and in oppositely disposed relation thereto, said first groove being formed substantially longer than either of said second and third grooves and having a greater pumping capacity than either of said second and third grooves; said bearing comprising a bearing housing member having an inwardly extending spider, a sleeve member secured to the inner end of said spider, a sleeve bearing member secured within said sleeve member and substantially coextensive therewith, said sleeve bearing member being positioned over the part of said shaft having said first groove, pluralities of wicks of absorbent material having spring qualities respectively abutting each end of said bearing member and being arranged on said shaft, annular thrust bearing members respectively abutting each of said pluralities of wicks and respectively positioned over the parts of said shaft having said second and third grooves, said thrust bearing members respectively having equispaced raised portions extending away from said wicks and further each respectively having a peripherally formed recess, annular members rigidly secured to said shaft and respectively having surfaces arranged in rotatably abutting relation with said thrust bearing members, said rigidly secured members having annular peripheral ridges formed thereon, said wicks being adapted to be impregnated with lubricant whereby rotation of said shaft will cause supplies of lubricant to be pumped respectively from one of said wicks by said first groove across the surface of said bearing member and by said second groove to the surface of one of said thrust bearing members, and from the other of said wicks by said third groove toward said bearing member whereby a predetermined differential supply of lubricant will be pumped to the surface of the other of said thrust bearing surfaces, said wicks and said second and third grooves being respectively adapted to exchange functions upon rotation of said shaft in the opposite direction, and means for returning said supplies of lubricant to said wicks comprising first and second strips of absorbent material formed into substantially cylindrical shapes and respectively spacedly arranged about said rigidly secured means, one of said strips having fingers formed on an end thereof and respectively arranged to extend through the openings of said spider, each of said strips having a finger formed thereon and arranged to extend respectively into said thrust bearing member recesses thereby to maintain said thrust bearing members in stationary assembled relation, said first mentioned fingers of said one strip being arranged to abut one of said pluralities of wicks, an annular wick member positioned radially between the other of said pluralities of wicks and the other of said strips and arranged to abut each of the same, and a mass of absorbent material positioned between said sleeve and said bearing housing and arranged to abut at one end against said wick member and at the other end against said one of said pluralities of wicks.

12. In combination, a bearing and a shaft rotatably mounted therein; said shaft having first and second helical grooves formed therein in oppositely disposed relation to each other; said bearing comprising a bearing member positioned over the part of said shaft having said first groove, wicks of absorbent material having spring qualities respectively abutting each end of said bearing member, a thrust bearing member abutting one of said wicks and positioned over the part of said shaft having said second groove, a member formed on said shaft and positioned in rotatably abutting relation with said thrust bearing member, said wick being adapted to be impregnated with lubricant whereby rotation of said shaft in one direction will cause supplies of lubricant to be pumped from said one wick respectively by said first groove across the surface of said bearing member and by said second groove to the surface of said thrust bearing member, and opposite rotation of said shaft will cause a supply of lubricant to be pumped from said other wick by said first groove across the surface of said bearing member and from said one wick by said second groove toward said bearing member, said first groove having a greater pumping capacity than said second groove whereby a predetermined differential supply of lubricant will be pumped to the surface of said thrust bearing member, and means for returning said supplies of lubricant to said wicks.

13. In combination, a bearing and a shaft rotatably mounted therein; said shaft having first and second helical grooves formed therein in oppositely disposed relation to each other; said bearing comprising a bearing member positioned over the part of said shaft having said first groove, annular wicks of absorbent material having spring qualities respectively abutting each end of said bearing member, an annular thrust bearing member having a central opening larger than said shaft abutting one of said wicks and spacedly positioned over the part of said shaft having said second groove, an annular member formed on said shaft and having a surface arranged in rotatably abutting relation with said thrust bearing member, said wick being adapted to be impregnated with lubricant whereby rotation of said shaft in one direction will cause supplies of lubricant to be pumped from said one wick respectively by said first groove across the surface of said bearing member and by said second groove to the surface of said thrust bearing member, and opposite rotation of said shaft will cause a supply of lubricant to be pumped from said other wick by said first groove across the surface of said bearing member and from said one wick by said second groove toward said bearing member, said first groove having a greater pumping capacity than said second groove whereby a predetermined differential supply of lubricant will be pumped to the surface of said thrust bearing member, and absorbent means abutting said wicks for returning said supplies of lubricant thereto.

14. In combination, a bearing and a shaft rotatably mounted therein; said shaft having first and second helical grooves formed therein in oppositely disposed relation to each other; said bearing comprising a bearing housing member having an inwardly extending spider, a bearing member secured to the inner part of said spider and positioned over the part of said shaft having said first groove, annular wicks of absorbent material having spring qualities respectively abutting each end of said bearing member, an annular thrust bearing member abutting one of said wicks and positioned over the part of said shaft having said second groove, an annular member rigidly secured to said shaft and having a surface arranged in rotatably abutting relation with said thrust bearing member, said rigidly secured member having peripheral ridges formed thereon, said wicks being adapted to be impregnated with lubricant whereby rotation of said shaft in one direction will cause supplies of lubricant to be pumped from said one wick respectively by said first groove across the surface of said bearing member and by said second groove to the surface of said thrust bearing member, and opposite rotation of said shaft will cause a supply of lubricant to be pumped from said other wick by said first groove across the surface of said bearing member and from said one wick by said second groove toward said bearing member, said first groove having a greater pumping capacity than said second groove whereby a predetermined differential supply of lubricant will be pumped to the surface of said thrust bearing member, and means for returning said supplies of lubricant to said wicks comprising a second annular member rigidly secured to said shaft and arranged in spaced relation with said other wick and having peripheral ridges formed thereon, first and second strips of absorbent material formed into substantially cylindrical shapes and respectively spacedly arranged about said rigidly secured members, at least one of said strips being arranged to have an end abutting said other wick, and an intermediate wick member arranged to connect the other of said strips to said one wick, said peripheral ridges being adapted to receive lubricant and sling it outwardly to said strips respectively.

15. In combination, a bearing and a shaft rotatably mounted therein; said shaft having first and second helical grooves formed therein in oppositely disposed relation to each other; said bearing comprising a bearing housing member having an inwardly extending spider, a bearing member secured to the inner part of said spider and positioned over the part of said shaft having said first groove, annular wicks of absorbent material having spring qualities respectively abutting each end of said bearing member, an annular thrust bearing member abutting one of said wicks and positioned over the part of said shaft having said second groove, an annular member formed on said shaft and having a surface arranged in rotatably abutting relation with said thrust bearing member, said member formed on said shaft having peripheral ridges formed thereon, said wicks being adapted to be impregnated with lubricant whereby rotation of said shaft in one direction will cause supplies of lubricant to be pumped from said one wick respectively by said first groove across the surface of said bearing member and by said second groove to the surface of said thrust bearing member and opposite rotation of said shaft will cause a supply of lubricant to be pumped from said other wick by said first groove across the surface of said bearing member and from said one wick by said second groove toward said bearing member, said first groove having a greater pumping capacity than said second groove whereby a predetermined differential supply of lubricant will be pumped to the surface of said thrust bearing member, and means for returning said supplies of lubricant to said wicks.

16. In combination, a bearing and a shaft rotatably mounted therein; said shaft having first and second helical grooves formed therein in oppositely disposed relation to each other, said first groove being formed longer than said second groove; said bearing comprising a bearing housing member having an inwardly extending spider, a sleeve member secured to the inner end of said spider, a bearing member secured within said sleeve member and substantially coextensive therewith, said bearing member being positioned over the part of said shaft having said first groove, a pair of annular wicks of absorbent material having spring qualities abutting one end of said bearing member, a single annular wick of absorbent material abutting the other end of said bearing member, an annular thrust bearing member having a central opening larger than said shaft abutting said pair of wicks and positioned over the part of said shaft having said second groove, said thrust bearing member having equispaced raised portions extending away from said pair of wicks, an annular member formed on said shaft and having a surface arranged in rotatably abutting relation with said portions of said thrust member, said member formed on said shaft having annular peripheral ridges formed thereon, a disc-like annular member positioned to abut said single wick and arranged over said shaft, a second member formed on said shaft in spaced relation to said disc-like member and having annular peripheral ridges formed thereon, said wicks being adapted to be impregnated with lubricant whereby rotation of said shaft in one direction will cause supplies of lubricant to be pumped from said one wick respectively by said first groove across the surface of said bearing member and by said second groove to the surface of said thrust bearing member, and opposite rotation of said shaft will cause a supply of lubricant to be pumped from said other wick by said first groove across the surface of said bearing member and from said one wick by said second groove toward said bearing member, said first groove having a greater pumping capacity than said second groove whereby a predetermined differential supply of lubricant will be pumped to the surface of said thrust bearing member, and means for returning said supplies of lubricant to said wicks comprising first and second strips of absorbent material formed into substantially cylindrical shapes and respectively spacedly arranged about said members formed on said shaft, one of said strips having fingers formed on an end thereof and arranged to extend through the openings of said spider into contact with said single wick, the other of said strips having an end arranged to contact said single wick, and a wick member positioned between said other strip and said pair of wicks and arranged to contact the same.

17. In combination, a bearing and a shaft rotatably mounted therein; said shaft having first and second helical grooves formed therein in oppositely disposed relation to each other; said bearing comprising a bearing member positioned over the part of said shaft having said first groove, a wick of absorbent material having spring qualities abutting an end of said bearing member, a thrust bearing member abutting said wick and positioned over the part of said shaft having said second groove, a member formed on said shaft and positioned in rotatably abutting relation with said thrust bearing member, said grooves each extending to said wick, said wick being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick including a second member formed on said shaft and arranged in axially spaced relation with said bearing member.

18. In combination, a bearing and a shaft rotatably mounted therein; said shaft having first and second helical grooves formed therein in oppositely disposed relation to each other; said bearing comprising a bearing member positioned over the part of said shaft having said first groove, a wick of absorbent material having spring qualities abutting an end of said bearing member said wick comprising a plurality of annular rings arranged in axially abutting relation and in contact with the periphery of said shaft, an annular thrust bearing member abutting said wick and positioned over the part of said shaft having said second groove, an annular member formed on said shaft and having a surface in rotatably abutting relation with said thrust bearing member, said grooves each extending to said wick, said wick being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick.

19. In combination, a bearing and a shaft rotatably mounted therein; said shaft having first and second helical grooves formed therein in oppositely disposed relation to each other; said bearing comprising a bearing housing member having an inwardly extending spider, a bearing member secured to the inner part of said spider and positioned over the part of said shaft having said first groove, an annular wick of absorbent material having spring qualities abutting an end of said bearing member, an annular thrust bearing member having a central opening larger than said shaft abutting said wick and positioned over the part of said shaft having said second groove, an annular member rigidly secured to said shaft and having a surface in rotatably abutting relation with said thrust bearing member, said rigidly secured member having peripheral grooves formed thereon, said grooves each extending to said wick, said wick being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick comprising a second annular member rigidly secured to said shaft and in axially spaced relation with the other end of said bearing member, said second rigidly secured member having peripheral ridges formed thereon, and absorbent material positioned within said bearing housing and extending axially between both said rigidly secured members to said wick.

20. In combination, a bearing and a shaft rotatably mounted therein; said shaft having first and second helical grooves formed therein in oppositely disposed relation to each other; said bearing comprising a bearing housing member having an inwardly extending spider, a sleeve member secured to the inner end of said spider, a bearing member secured within said sleeve member and substantially coextensive therewith, said bearing member being positioned on the part of said shaft having said first groove, a wick abutting an end of said bearing member, said wick comprising a plurality of annular rings of absorbent material having spring qualities arranged in axially abutting relation and in contact with the surface of said shaft, an annular thrust bearing member abutting said wick and positioned over the part of said shaft having said second groove, said thrust bearing member having equispaced raised portions extending away from said wick, an annular thrust bearing member formed on said shaft and having a surface in rotatably abutting relation with said raised portions, said member formed on said shaft having annular peripheral ridges formed on the surface thereof, said grooves each extending to said wick, said wick being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick comprising a second annular member formed on said shaft and in axially spaced relation with the other end of said bearing member, said second member formed on said shaft having annular peripheral ridges formed thereon, first and second strips of absorbent material formed into substantially cylindrical shapes and respectively spacedly arranged about said member, formed on said shaft, one of said strips having fingers formed on an end thereof and respectively arranged to extend through the openings of said spider, and a wick member of absorbent material arranged with said housing in contact with said fingers and with said second strip and with said wick.

21. In combination, a bearing and a shaft rotatably mounted therein; said shaft having first and second helical grooves formed therein in oppositely disposed relation to each other; said bearing comprising a bearing housing member having an inwardly extending spider, a bearing member secured to the inner part of said spider and positioned over the part of said shaft having said first groove, an annular wick of absorbent material having spring qualities abutting an end of said bearing member, an annular thrust bearing member abutting said wick and positioned over the part of said shaft having said second groove, an annular member rigidly secured to said shaft and having a surface in rotatably abutting relation with said thrust bearing member, said rigidly secured member having peripheral grooves formed thereon, said grooves each extending to said wick, said wick being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick comprising a second annular member rigidly secured to said shaft and arranged in axially spaced relation with the other end of said bearing member, said second rigidly secured member having peripheral ridges formed thereon, and a mass of absorbent material extending axially between said first rigidly secured member and said wick.

22. In combination, a bearing and a shaft rotatably mounted therein; said shaft having first and second helical grooves formed therein in oppositely disposed relation to each other; said bearing comprising a bearing housing member having an inwardly extending spider, a sleeve member secured to the inner end of said spider, a bearing member secured within said sleeve member and substantially coextensive therewith, said bearing member being positioned on the part of said shaft having said first groove, a wick abutting an end of said bearing member, said wick comprising a plurality of annular rings of absorbent material having spring qualities arranged in axially abutting relation and in contact with the periphery of said shaft, an annular thrust bearing member having a central opening larger than said shaft abutting said wick and spacedly positioned over the part of said shaft having said second groove, said thrust bearing member having equispaced raised portions extending away from said wick, an annular member formed on said shaft and having a surface in rotatably abutting relation with said raised portions, said member formed on said shaft having annular peripheral ridges formed on the surface thereof, said grooves each extending to said wick, said wick being adapted to be impregnated with lubricant whereby rotation of said shaft will cause supplies of lubricant to be pumped respectively by said first groove across the surface of said bearing member and by said second groove to the surface of said thrust bearing member, and means for returning both of said supplies of lubricant to said wick comprising a second annular member formed on said shaft and in axially spaced relation with the other end of said bearing member, said second member formed on said shaft having annular peripheral ridges formed thereon, a strip of absorbent material formed into a substantially cylindrical shape and spacedly arranged about said first member formed on said shaft, and a wick member of absorbent material arranged within said housing in contact with said strip and said wick whereby said first member formed on said shaft is adapted to sling lubricant out to said strip to be returned to said wick and said second member formed on said shaft is adapted to sling lubricant out to said bearing housing whence it is adapted to flow through said spider to be returned to said wick.

References Cited in the file of this patent

UNITED STATES PATENTS

| | | |
|---|---|---|
| 2,571,672 | Bradley | Oct. 16, 1951 |
| 2,633,393 | Bradley | Mar. 31, 1953 |